(12) United States Patent
Davis

(10) Patent No.: US 10,710,519 B1
(45) Date of Patent: Jul. 14, 2020

(54) VEHICLE WIRING HARNESS ASSEMBLY

(71) Applicant: Clint Davis, Paola, KS (US)

(72) Inventor: Clint Davis, Paola, KS (US)

(*) Notice: Subject to any disclaimer, the term of this patent is extended or adjusted under 35 U.S.C. 154(b) by 0 days.

(21) Appl. No.: 16/447,267

(22) Filed: Jun. 20, 2019

(51) Int. Cl.
*B60R 16/02* (2006.01)
*B60R 16/023* (2006.01)
*H01R 13/04* (2006.01)
*H02G 3/08* (2006.01)
*H02G 3/16* (2006.01)
*B60R 16/033* (2006.01)

(52) U.S. Cl.
CPC ...... *B60R 16/0207* (2013.01); *B60R 16/0239* (2013.01); *B60R 16/033* (2013.01); *H01R 13/04* (2013.01); *H02G 3/083* (2013.01); *H02G 3/16* (2013.01)

(58) Field of Classification Search
CPC ............ B60R 16/0207; B60R 16/0239; B60R 16/033; H01R 13/04; H02G 3/083; H02G 3/01
USPC .......................................................... 307/9.1
See application file for complete search history.

(56) References Cited

U.S. PATENT DOCUMENTS

| | | | | |
|---|---|---|---|---|
| 4,005,922 A | * | 2/1977 | Burkhart | H01R 13/512 439/465 |
| 4,901,058 A | | 2/1990 | Comeau | |
| 4,944,697 A | * | 7/1990 | Dorman | H01H 85/0417 337/255 |
| 5,455,734 A | * | 10/1995 | Foreman | G06F 21/00 361/118 |
| 5,476,396 A | * | 12/1995 | De Castro | B60R 16/02 439/620.31 |
| 5,539,377 A | | 7/1996 | Dillon | |
| 5,581,130 A | * | 12/1996 | Boucheron | B60R 16/0238 307/10.1 |
| 6,011,319 A | * | 1/2000 | Kelly | H05K 1/0265 307/10.1 |
| 6,611,201 B1 | | 8/2003 | Bishop | |
| 6,674,182 B2 | | 1/2004 | Maynard | |
| 7,708,097 B1 | * | 5/2010 | Tharaldson | B62M 27/02 180/190 |
| 2006/0178028 A1 | * | 8/2006 | Swiatek | H01R 24/58 439/215 |
| 2006/0221558 A1 | * | 10/2006 | Sutton | H01R 31/06 361/600 |
| 2008/0079552 A1 | * | 4/2008 | Schultz | B60R 16/0207 340/431 |
| 2011/0174244 A1 | * | 7/2011 | Maki | F01P 5/12 123/41.1 |

(Continued)

*Primary Examiner* — Daniel Kessie
*Assistant Examiner* — Kalu Kelly Emeaba

(57) ABSTRACT

A vehicle wiring harness assembly for installing an aftermarket electronic device into a vehicle electrical system includes a relay plug that is insertable into a starter relay socket in a vehicle electrical system fuse box. The relay plug takes the place of the starter relay in the vehicle electrical system fuse box. A fuse plug is insertable into a fuse slot in the vehicle electrical system fuse box. Thus, the fuse plug is in electrical communication with the battery of the vehicle electrical system. A wiring harness is electrically coupled to each of the relay plug and the fuse plug. In this way the wiring harness can supply voltage and ground to an aftermarket electronic device without modifying existing wiring in the vehicle electrical system.

10 Claims, 4 Drawing Sheets

(56) References Cited

U.S. PATENT DOCUMENTS

| | | | |
|---|---|---|---|
| 2011/0251736 A1* | 10/2011 | Lazzara | B60R 25/045 |
| | | | 701/2 |
| 2013/0115788 A1* | 5/2013 | Broughton | H01R 12/78 |
| | | | 439/67 |
| 2017/0054881 A1* | 2/2017 | Conger | H04N 5/2253 |
| 2017/0133811 A1* | 5/2017 | Conger | H01R 43/005 |
| 2018/0154846 A1* | 6/2018 | Kiyosue | H02G 3/16 |
| 2018/0326931 A1* | 11/2018 | Naganishi | H02G 3/16 |
| 2019/0161032 A1* | 5/2019 | Einert | H01B 7/0045 |
| 2019/0275966 A1* | 9/2019 | Nakamura | G01R 3/00 |
| 2019/0372321 A1* | 12/2019 | Takamatsu | H01B 7/0045 |

\* cited by examiner

VEHICLE WIRING HARNESS ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to wiring devices and more particularly pertains to a new wiring device for installing an aftermarket electronic device in a vehicle electrical system.

BRIEF SUMMARY OF THE INVENTION

An embodiment of the disclosure meets the needs presented above by generally comprising a relay plug that is insertable into a starter relay socket in a vehicle electrical system fuse box. The relay plug takes the place of the starter relay in the vehicle electrical system fuse box. A fuse plug is insertable into a fuse slot in the vehicle electrical system fuse box. Thus, the fuse plug is in electrical communication with the battery of the vehicle electrical system. A wiring harness is electrically coupled to each of the relay plug and the fuse plug. In this way the wiring harness can supply voltage and ground to an aftermarket electronic device without modifying existing wiring in the vehicle electrical system.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
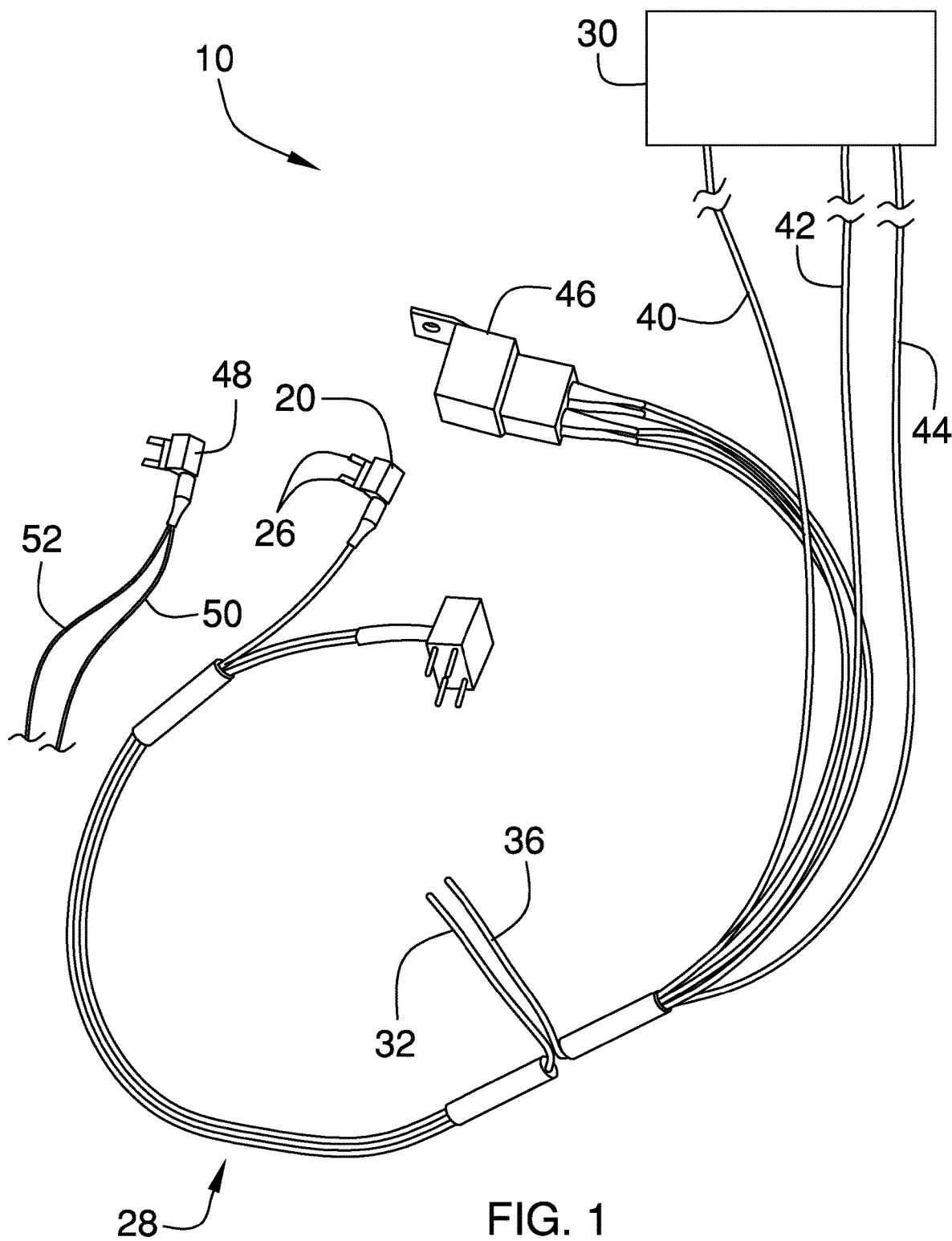
FIG. 1 is a perspective view of a vehicle wiring harness assembly according to an embodiment of the disclosure.
Figure 2:
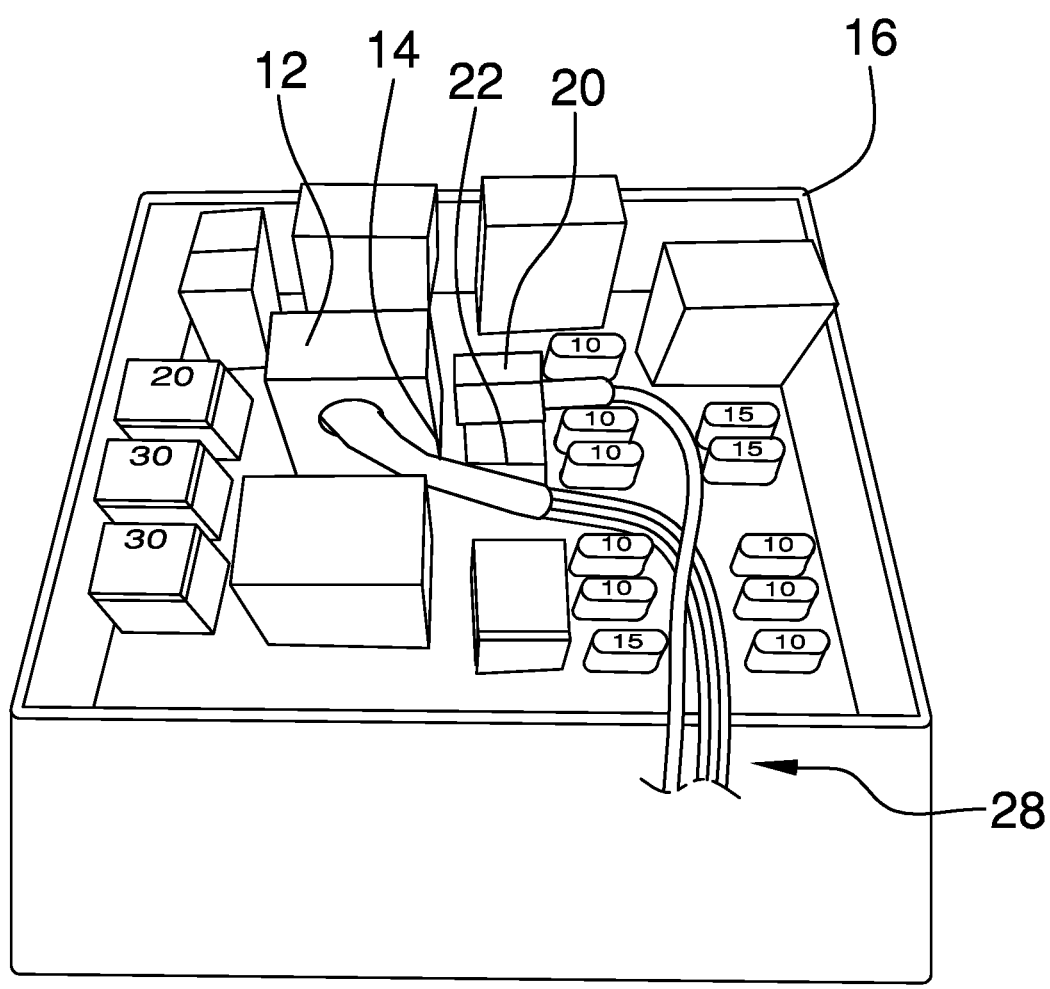
FIG. 2 is a perspective in-use view of an embodiment of the disclosure.
Figure 3:
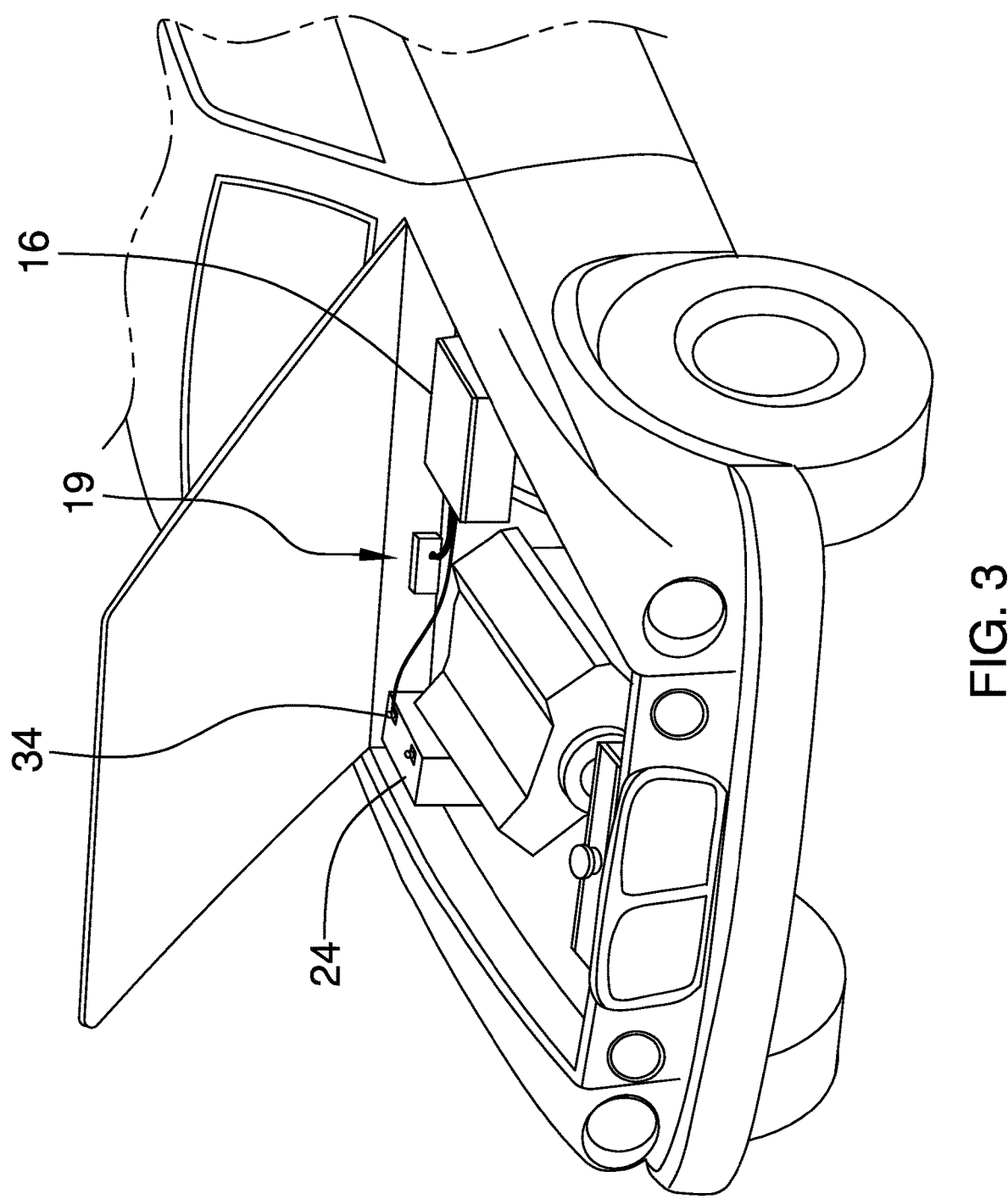
FIG. 3 is a front perspective view of an embodiment of the disclosure.

With reference now to the drawings, and in particular to FIGS. 1 through 4 thereof, a new wiring device embodying the principles and concepts of an embodiment of the disclosure and generally designated by the reference numeral 10 will be described.

As best illustrated in FIGS. 1 through 4, the vehicle wiring harness assembly 10 generally comprises a relay plug 12 that is insertable into a starter relay socket 14 in a vehicle electrical system fuse box 16. Moreover, the relay plug 12 replaces the starter relay in the vehicle electrical system fuse box 16. The relay plug 12 has a plurality of electrical pins 18 thereon and each of the electrical pins 18 is positioned at strategic locations for aligning with a respective electrical contact in the starter relay socket 14. The vehicle electrical system 19 may be an electrical system in a passenger vehicle, a cargo vehicle or any other motorized vehicle that can be driven on public roadways.

A fuse plug 20 is included and the fuse plug 20 is insertable into a fuse slot 22 in the vehicle electrical system fuse box 16. In this way the fuse plug 20 is in electrical communication with a battery 24 of the vehicle electrical system 19. The fuse plug 20 has a pair of electrical contacts 26 thereon. Each of the electrical contacts 26 is positioned at a strategic orientation for fitting into existing fuse slots in vehicle electrical system fuse boxes. The existing fuse slots may be blade fuse slots, tubular fuse slots or any other type of fuse slot commonly found in vehicle fuse boxes.

A wiring harness 28 is provided and the wiring harness 28 is electrically coupled to each of the relay plug 12 and the fuse plug 20. In this way the wiring harness 28 can supply voltage and ground to an aftermarket electronic device 30 without modifying existing wiring in the vehicle electrical system. The aftermarket electronic device 30 may be an alcohol interlock machine, a remote starter system or any other electronic device that can be installed in a motor vehicle. The wiring harness 28 is electrically coupled to each of the electrical pins 18 on the relay plug 12 and each of the electrical contacts 26 on the fuse plug 20. In this way the wiring harness 28 facilitates a constant voltage circuit and a ground circuit 38 for the aftermarket electronic device 30.

The wiring harness 28 has a voltage lead 32 that is in electrical communication with a positive terminal 34 of the battery 24 for supplying constant voltage to the aftermarket electronic device 30. The wiring harness 28 has a ground lead 36 that is in electrical communication with the ground circuit 38 in the vehicle electrical system 19 to supply a ground the aftermarket electronic device 30. The aftermarket electronic device 30 may be an alcohol interlock machine which acts as a controlling unit for the starter relay. In this way the vehicle cannot be started unit the conditions of the controlling unit are satisfied.

The wiring harness 28 has a constant battery power lead 40 that is in electrical communication with the positive terminal 34 of the battery 24. Thus, the constant battery power lead 40 can supply constant voltage to an external circuit. The wiring harness 28 has a switched voltage lead 42 that is in electrical communication with an ignition circuit 43 of the vehicle electrical system 19. In this way the switched voltage lead 42 can supply switched voltage to the external circuit. The wiring harness 28 has an external ground lead 44 that is in electrical communication with the ground circuit 38 in the vehicle electrical system 19. Thus, the external ground lead 44 can supply a ground to the external circuit.

Figure 4:
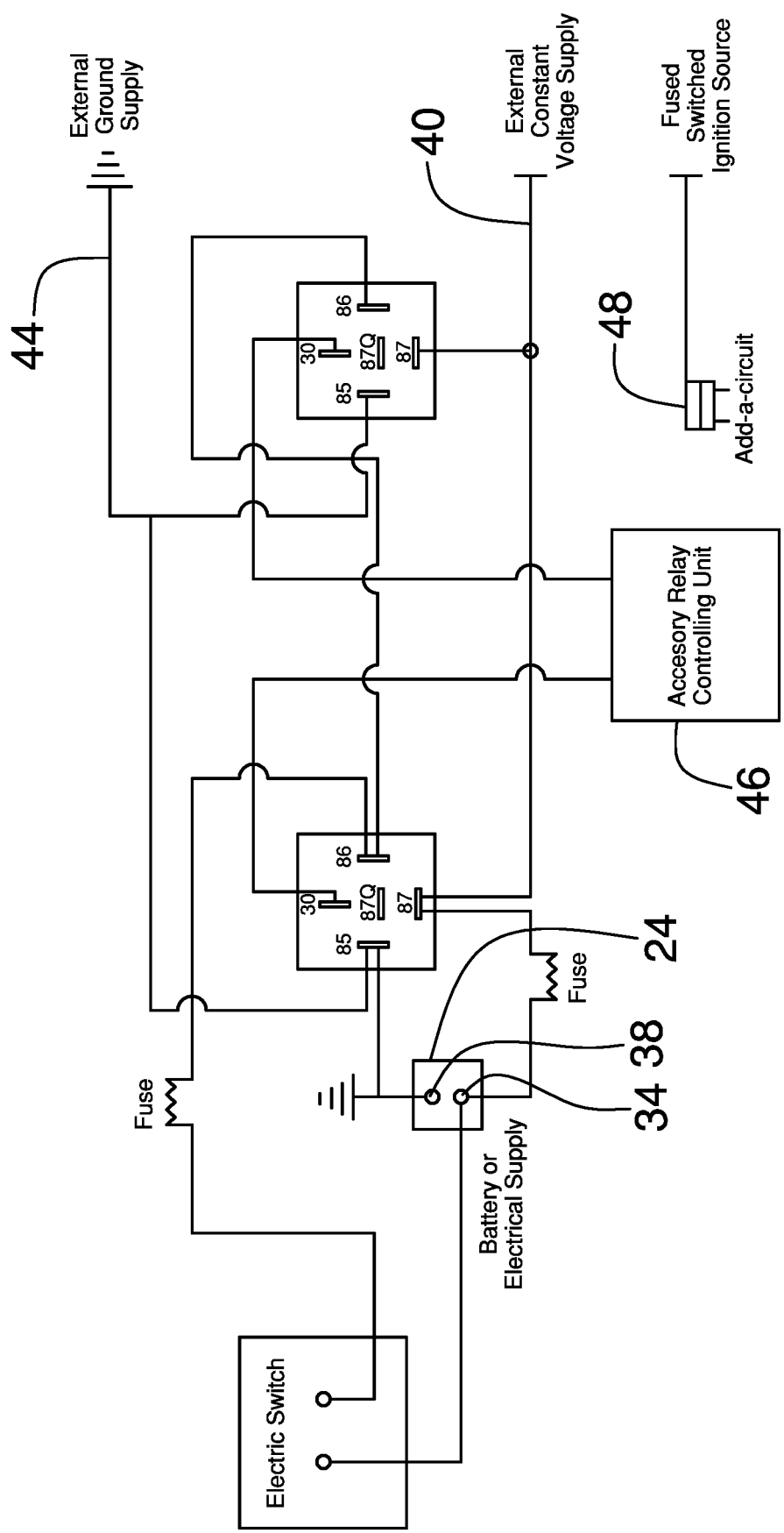
FIG. 4 is a schematic view of an embodiment of the disclosure.

An accessory relay 46 is electrically coupled to the wiring harness 28. The accessory relay 46 is in electrical communication with the vehicle electrical system 19 when the relay plug 12 is plugged into the starter relay socket 14 and the fuse plug 20 is plugged into the fuse slot 22. The accessory relay 46 may act as the factory starter relay for facilitating normal operation of the ignition circuit 43 on the vehicle electrical system 19. The accessory relay 46 may comprise, but not be limited to, an electro-magnetic relay that is common to vehicle starter circuits. An auxiliary fuse plug 48 is provided that can be plugged into a selected fuse slot 22 in the vehicle electrical system fuse box 16. The auxiliary fuse plug 48 has a power lead 50 and a ground lead 52, and the auxiliary fuse plug 20 can easily create an additional circuit for powering any electronic device. FIG. 4 of the embodiment of the disclosure shows one possible wiring schematic that could result from installing the relay plug 12 and the fuse plug 20 into the vehicle electrical system fuse box 16.

In use, the factory starter relay is removed from the starter relay socket 14 in the vehicle electrical system fuse box 16. The relay plug 12 is plugged into the starter relay socket 14 and the fuse plug 20 is plugged into a selected fuse slot 22 in the vehicle electrical system fuse box 16. In this way the wiring harness 28 can supply constant voltage, switched voltage and a ground to the aftermarket electronic device 30 without having to modify existing wiring in the vehicle electrical system 19. Each of the voltage lead 32, the ground lead 36, the constant battery power lead 40, the switched voltage lead 42 and the external ground lead 44 can be electrically coupled to any electronic device for operational purposes. An alcohol interlock machine, or other controlling unit, can be electrically coupled to the voltage lead 32 and the ground lead 36. In this way the factory ignition circuit can be overridden without having to make any changes, such as electrical splices or the like, to the vehicle electrical system 19. Each of the relay plug 12 and the fuse plug 20 can be removed from the vehicle electrical system fuse box 16 at any time to return the vehicle to factory operation.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle wiring harness assembly being configured to be electrically coupled to electrical sockets in a vehicle fuse box thereby facilitating an aftermarket electronic device to be integrated into the vehicle's electrical system, said assembly comprising:
    a relay plug being insertable into a starter relay socket in a vehicle electrical system fuse box wherein said relay plug is configured to replace the starter relay in the vehicle electrical system fuse box;
    a fuse plug being insertable into a fuse slot in the vehicle electrical system fuse box wherein said fuse plug is configured to be in electrical communication with a battery of the vehicle electrical system;
    a wiring harness being electrically coupled to each of said relay plug and said fuse plug wherein said wiring harness is configured to supply voltage and ground to an aftermarket electronic device without modifying existing wiring in the vehicle electrical system.

2. The assembly according to claim 1, wherein said relay plug has a plurality of electrical pins thereon, each of said electrical pins being positioned at strategic locations for aligning with a respective electrical contact in the starter relay socket.

3. The assembly according to claim 2, wherein said fuse plug has a pair of electrical contacts thereon, each of said electrical contacts being positioned at a strategic orientation for fitting into existing fuse slots in vehicle electrical system fuse boxes.

4. The assembly according to claim 3, wherein said wiring harness is electrically coupled to each of said electrical pins on said relay plug and each of said electrical contacts on said fuse plug wherein said wiring harness is configured to facilitate a constant voltage circuit and a ground circuit for an aftermarket electronic device.

5. The assembly according to claim 4, wherein:
    said wiring harness has a voltage lead being in electrical communication with a positive terminal of the battery wherein said voltage lead is configured to supply constant voltage to an electronic device; and
    said wiring harness has a ground lead being in electrical communication with the ground circuit in the vehicle electrical system wherein said ground lead is configured to supply a ground the electronic device.

6. The assembly according to claim 4, wherein said wiring harness has a constant battery power lead being in electrical communication with the positive terminal of the battery wherein said constant battery power lead is configured to supply constant voltage to an external circuit.

7. The assembly according to claim 6, wherein said wiring harness has a switched voltage lead being in electrical communication with an ignition circuit of the vehicle electrical system wherein said switched voltage lead is configured to supply switched voltage to the external circuit.

8. The assembly according to claim 7, wherein said wiring harness has an external ground lead being in electrical communication with the ground circuit in the vehicle electrical system wherein said external ground lead is configured to supply a ground to the external circuit.

9. The assembly according to claim 4, further comprising an accessory relay being electrically coupled to said wiring harness wherein said accessory relay is configured to be in electrical communication with the vehicle electrical system when said relay plug is plugged into the starter relay socket and said fuse plug is plugged into the fuse slot, said accessory relay supplying voltage and ground to an accessory electronic device.

10. A vehicle wiring harness assembly being configured to be electrically coupled to electrical sockets in a vehicle fuse box thereby facilitating an aftermarket electronic device to be integrated into the vehicle's electrical system, said assembly comprising:
   a relay plug having a plurality of electrical pins thereon, said relay plug being insertable into a starter relay socket in a vehicle electrical system fuse box wherein said relay plug is configured to replace the starter relay in the vehicle electrical system fuse box, each of said electrical pins being positioned at strategic locations for aligning with a respective electrical contact in the starter relay socket;
   a fuse plug having a pair of electrical contacts thereon, said fuse plug being insertable into a fuse slot in the vehicle electrical system fuse box wherein said fuse plug is configured to be in electrical communication with a battery of the vehicle electrical system, each of said electrical contacts being positioned at a strategic orientation for fitting into existing fuse slots in vehicle electrical system fuse boxes;
   a wiring harness being electrically coupled to each of said relay plug and said fuse plug wherein said wiring harness is configured to supply voltage and ground to an aftermarket electronic device without modifying existing wiring in the vehicle electrical system, said wiring harness being electrically coupled to each of said electrical pins on said relay plug and each of said electrical contacts on said fuse plug wherein said wiring harness is configured to facilitate a constant voltage circuit and a ground circuit for an aftermarket electronic device, said wiring harness having a voltage lead being in electrical communication with a positive terminal of the battery wherein said voltage lead is configured to supply constant voltage to an electronic device, said wiring harness having a ground lead being in electrical communication with the ground circuit in the vehicle electrical system wherein said ground lead is configured to supply a ground the electronic device, said wiring harness having a constant battery power lead being in electrical communication with the positive terminal of the battery wherein said constant battery power lead is configured to supply constant voltage to an external circuit, said wiring harness having a switched voltage lead being in electrical communication with an ignition circuit of the vehicle electrical system wherein said switched voltage lead is configured to supply switched voltage to the external circuit, said wiring harness having an external ground lead being in electrical communication with the ground circuit in the vehicle electrical system wherein said external ground lead is configured to supply a ground to the external circuit; and
   an accessory relay being electrically coupled to said wiring harness wherein said accessory relay is configured to be in electrical communication with the vehicle electrical system when said relay plug is plugged into the starter relay socket and said fuse plug is plugged into the fuse slot, said accessory relay supplying voltage and ground to an accessory electronic device.

* * * * *